United States Patent [19]

Fuchs

[11] 4,234,009
[45] Nov. 18, 1980

[54] STRAIGHT FLOW SEAT VALVE

[75] Inventor: Franz Fuchs, Starnberg, Fed. Rep. of Germany

[73] Assignee: Messerschmitt-Bölkow-Blohm GmbH, Fed. Rep. of Germany

[21] Appl. No.: 944,913

[22] Filed: Sep. 22, 1978

[30] Foreign Application Priority Data

Oct. 6, 1977 [DE]  Fed. Rep. of Germany ..... 27449178

[51] Int. Cl.$^3$ ..................... F16K 1/12; F16K 31/122
[52] U.S. Cl. ................................................. 137/219
[58] Field of Search ........................................ 137/219

[56] References Cited

U.S. PATENT DOCUMENTS

| | | | |
|---|---|---|---|
| 2,725,891 | 12/1955 | DeBourguignon | 137/219 |
| 2,950,732 | 8/1960 | Lambert | 137/219 |
| 3,704,856 | 12/1972 | Swiecicki | 137/219 X |

FOREIGN PATENT DOCUMENTS 2332622  1/1975  Fed. Rep. of Germany ........... 137/219

*Primary Examiner*—Gerald A. Michalsky
*Attorney, Agent, or Firm*—McGlew and Tuttle

[57] ABSTRACT

A straight flow seat valve, comprising, a valve housing with a valve chamber therein having an inlet at one end and an outlet at the opposite end which is coaxial with the inlet. A control cylinder is supported in the valve chamber between the outlet and inlet and has a control fluid inlet extending out of the housing for the admission of a control fluid into the chamber in order to move a piston against a spring-biasing force so as to shift a seat body having a seat surface in engagement with a seat adjacent the outlet end so that it is lifted off the seat to open the valve. The seat body is advantageously streamlined at each end to permit flow around it from the inlet around the valve and out through the outlet. In the pressureless state, the spring urges the surface of the seat body onto the valve seat to close the valve.

6 Claims, 2 Drawing Figures

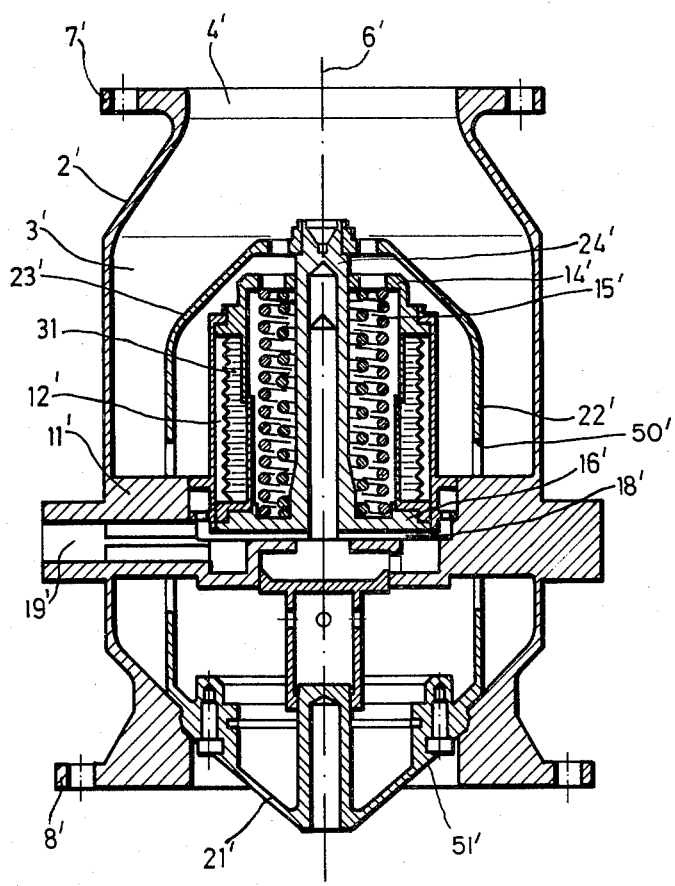

4,234,009

STRAIGHT FLOW SEAT VALVE

FIELD AND BACKGROUND OF THE INVENTION

This invention relates to valves in general and, in particular, to a new and useful straight flow seat valve, comprising, a valve housing, with a valve chamber, an inlet into the valve chamber, and an outlet coaxial thereto, with a seating surface for a seat body and a control cylinder in the valve chamber which is acted upon by a hydraulic or pneumatic control medium for the seat body, which can be actuated in a flow direction and is connected through a piston rod to a control piston in the control cylinder and is kept in the pressureless state of the control cylinder, on the seating surface at the outlet, by a spring acting upon the control piston.

DESCRIPTION OF THE PRIOR ART

Shutoff valves which are closed under no pressure are used in the machine building industry and often include a large flow section, or they are used in astronautics. The valves of such control cylinders are rigidly mounted in the valve chamber and supplied with a control medium through a control line coming out of the valve housing. The control piston is sealed against the control cylinder at its outside diameter, such as by an O-ring, or by a bellows. The control cylinder is open on its end facing the inlet so that the control piston surface facing the inlet can be acted upon by the pressure medium flowing into the valve chamber and is pushed by the medium's static pressure in a flow direction against the seating surface at the outlet, supported by a compression spring. On its end facing the outlet, the control piston supports a piston rod which comes out of the control cylinder through another seal, which may be, for example, an O-ring or a bellows, and is connected to the seat body. Consequently, in the pressureless state of the control cylinder, the seat body is pushed in a flow direction against the outlet on the seating surface and closes the valve. See German Pat. No. DT-OS 23 32 622.

If a control fluid is let into the control cylinder through the control line, the control piston surface connected to the piston rod is acted upon and is pushed in the direction towards the inlet to a stop, countering the spring force and the pressure of the pressure medium. This causes the seat body to lift off the seating surface and the valve is opened for passage.

If used only for the arrangement of the entire valve control in the valve chamber, i.e., in the flow channel of the pressure medium, the design of such shutoff valves is not simple because the pressure chamber for the control fluid must be completely sealed against the pressure medium in the interior of the valve. Accordingly, these sealing points necessitate a costly design with many components and are always a weak point of the entire valve.

In addition, the multiplicity of the components to be used imposes limits to the structural length of the seat valve. However, endeavors are made to keep this structural length as short as possible since it also helps to keep the pressure drop to a minimum in the valve along the flow path of the pressure medium. Only then is the initial output pressure of the pressure medium still available in approximation at the end of the line, even when several successive valves are installed in the pressure medium line.

Shutoff valves of the type described at the outset, in which the seat body is pushed against the seating surface at the outlet in the pressureless state of the control cylinder, against the flow direction in a direction towards the inlet, are also known. This design only requires one seal of the control piston against the pressure chamber of the control cylinder and requires no seal of the piston rod, but this apparent advantage, namely, the elimination of one seal, only results in other disadvantages.

The static pressure of the pressure medium, which tends to lift the seat body off of the seating surface, still acts upon the seat body in the closed position. This pressure is partly cancelled out, or compensated, by the oppositely directed static pressure against the free control piston surface. This means, however, that the bearing pressure of the seat body against the seating surface and also the closing motion of the seat body are, in essence, determined by the spring force and the spring characteristic of the compression spring. Apart from the necessity of making the spring very strong, bothersome bounce vibrations may occur in this design of a seat valve when the seat body seats itself on the seating surface.

In a valve of the first described kind, in which the pressure of the pressure medium acts upon the seat body and on the free surface of the control piston in the same direction, the spring is noticeably supported by the pressure medium so that both the closing motion and the bearing pressure of the seat body are determined by the properties of the spring and also of the damping pressure medium.

Furthermore, in a valve of the kind described in the second place, the seat body is disposed outside of the valve chamber accommodating the entire valve control, on the other side of the outlet. Since the flow section should be as constant as possible over the entire structural length of the valve when the valve is open, a complicated valve housing design is required because the pressure medium flowing out of the outlet of the open valve must be conducted around the seat body once more. This increases the structural length of the entire valve noticeably and makes the pressure drop relatively great.

SUMMARY OF THE INVENTION

The present invention provides a seat valve construction in which the fewest possible components, particularly, seals and parts associated with the seals, are used, thereby, achieving a short structural length with a correspondingly small pressure drop.

According to the invention, the piston rod is disposed at the control piston end facing away from the seat body and is rigidly fastened to the seat body through a connection enveloping the control cylinder.

A seat valve according to the invention requires only one sealing point, namely, the control piston against the control cylinder, between the control medium pressure chamber, the control cylinder and the valve chamber. In addition, the closing motion and the closing position of the seat body are determined not only by the compression spring acting upon the control piston, but are additionally supported by the pressure medium flowing into the valve chamber and acting upon the seat body and the free surface of the control piston.

Consequently, as compared to the known seat valves of the kind first described above, the design is simplified particularly in that only one seal of the control fluid pressure chamber against the valve chamber of the seat body is required. Since it is the sealing points which necessitate a costly design, with a multiplicity of closely fitting components, the design is thus simplified considerably. In addition, the valve operates automatically in a more reliable manner and repairs can be made more easily and at less cost.

Add to this that the structural length of the entire seat valve is shortened in comparison to a seat valve of the kind first described above, particularly, when it is taken into account that in valves of large flow sections, it is general practice to use metal bellows as seals which are of great structural length with complicated fastenings.

Overall, a seat valve according to the invention is less expensive in design than the first described seat valves, and its structural length is shorter, and this also results in less weight. The advantages of the known seat valves, in particular, the support of the spring force by the pressure medium, are advantageously retained in a valve according to the invention.

In comparison with known seat valves of the second kind described above, a seat valve according to the invention has a considerably shorter structural length because all of the moving parts which serve to shut off the valve are disposed in the valve chamber. This results in a smaller pressure loss than in the known seat valves of this type over the structural length of the seat valve, and also in considerably less weight.

In accordance with one preferred embodiment of the invention, the connection between the seat body and the piston rod is a streamlined part for the formation of a constant flow section in the valve chamber.

Through such a design of the connection between the seat body and the piston rod, the design of the entire seat valve can also be simplified, since it is much simpler to produce a connection such as one of tubular shape so as to favor flow, rather than to give the control cylinder, with its turned and milled parts, streamlined outside dimensions, as is the usual practice. This can also reduce the production costs of the seat valve, because the boundary walls affecting the passage of the pressure medium are determined only by the connection, such as one designed with a streamlined shape, between the seat body and the piston rod, and not perhaps by the outside walls of the control cylinder.

Accordingly, an object of the invention is to provide a straight flow seat valve, which comprises a valve housing having a valve chamber therein, with an inlet at one end and an outlet at the opposite end which is coaxial with the inlet and with a control cylinder being supported in the chamber between the outlet and the inlet having a control fluid inlet extending out of the housing to permit flow of the control fluid therein for moving a control piston which is movable in the cylinder so as to shift a seat body which is connected to the piston so that its seating surface lifts off a valve seat adjacent the outlet so as to open the outlet and with a spring acting on the piston to move it into a closed position during a pressureless state in which there is no control fluid in the control cylinder.

A further object of the invention is to provide a straight flow seat valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2 is a view, similar to FIG. 1, of another embodiment of the invention.

DESCRIPTION OF THE PREFERRED EMBODIMENTS

Figure 1:
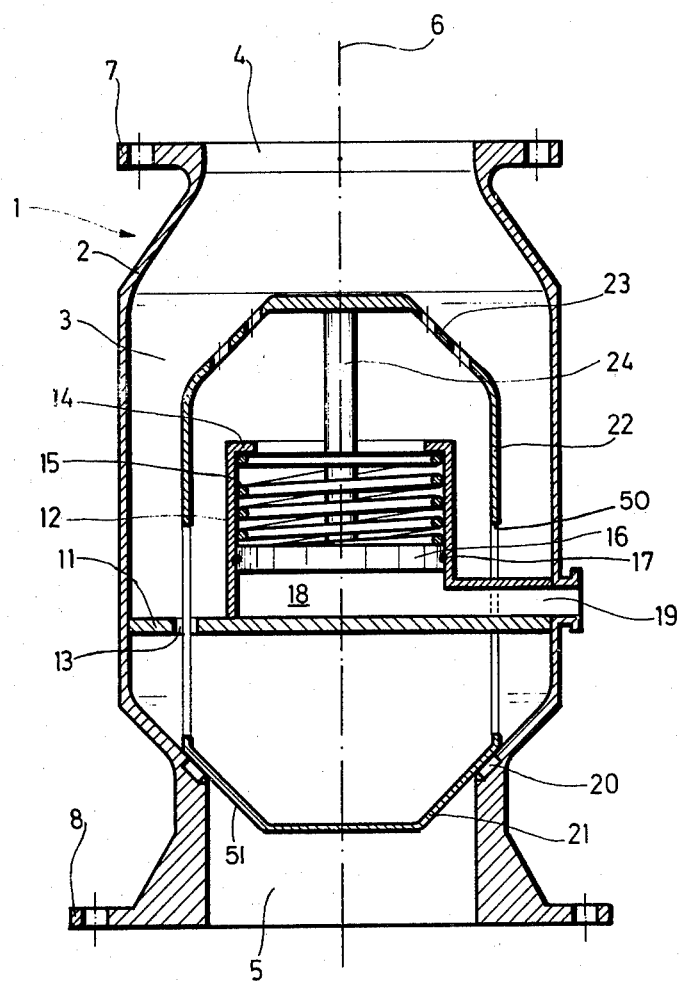
FIG. 1 is a transverse section of a seat valve constructed in accordance with the invention.

Referring to the drawings in particular, the invention embodied therein in FIG. 1, comprises, a seat valve, generally designated 1, which includes a valve inlet 4 at one end which is coaxially arranged in respect to a valve axis 6 with an outlet 5 at the opposite end of the valve housing. A valve control cylinder is supported in the valve chamber 3 defined in the interior of the housing between the inlet and the outlet and it includes an inlet pressure line 19 for admitting pressure fluid to move a control piston 16 which is connected through a piston rod 24 to a seat body 21 so that the seat body 21 is moved off a seating surface 20 to open the valve. In the pressureless state, a spring 15 arranged in a control cylinder between an end seat or stop 14 and the piston 16 urges the piston in a direction to cause the seat body 21 to seat against the seating surface 20.

The seat valve 1 comprises a valve housing 2 with a valve chamber 3, into which an inlet 4 empties at one end. An outlet 5, at the other end of the valve chamber, is disposed coaxial to inlet 4. The valve chamber and the inlet and outlet are rotation symmetrical with respect to the valve axis 6. The valve housing is provided with flanges 7 and 8, respectively, on both ends at the inlet and outlet, to which pipe lines, coaxial to the valve axis 6, can be fastened.

A supporting structure 11, to which a control cylinder 12 is mounted, is mounted in the lower half of the valve chamber 3 facing the outlet 5. The supporting structure 11 has breakthroughs 13 arranged in such a manner that the flow section for the pressure medium, which is determined by the cross-sectional area of the inlet and outlet, is not affected. The control cylinder 12 extends from the supporting structure 11 in the direction of the inlet 4 and has a seat 14 for a compression spring 15 at its end facing inlet 14. The other end of the compression spring 15 supports itself against the surface of a control piston 16 in the control cylinder 12 facing inlet 4. A control piston 16 is sealed against the cylinder wall by means of an O-ring 17 which hugs its outside diameter.

The surface of the control piston 16 facing away from the inlet 4, in addition to the side walls of the control cylinder and the bottom surface integrated with the supporting structure 11, defines a pressure chamber 18 of the control cylinder 12, into which a control fluid flows through a pressure line 19 coming out of the valve housing 2.

The outlet 5 has a seating surface 20 in an area facing valve chamber 3 which is designed, for example, as a conventional plastic seating ring. A tapered seat body 21 rests against this seating surface 20. The seat body 21 is connected to a tubular connecting part 22 which extends in the direction of the inlet and is coaxial to the valve axis 6. Connecting part 22 goes over into a conical end piece 23 which faces inlet 4. Seat body 21, connecting part 22 and end piece 23 form a streamlined valve body which is shaped so that the flow section for the pressure medium through the valve is approximately the same over the entire structural length of the seat valve when the seat body is completely lifted off.

A piston rod 24 which is fastened to the control piston 16 and extends along the valve axis 6 is connected to the end piece 23 of the seat body. In the normal position of the seat valve, the sealing face 51 of seat body 21 is pushed against seating surface 20 by the force of compression spring 15. This bearing pressure is yet supported by the static pressure of the pressure medium in the valve chamber 3 which acts in the same direction upon the surface of the control piston 16 which is connected to the piston rod 24, and upon the seat body 21.

When the seat body 21 is to be opened for passage, a control fluid is pressed through the control passage 19 into the pressure chamber 18 of the control cylinder. This causes the control piston 16 to be moved along the valve axis in the direction of the inlet 4 in the control cylinder, thereby, at the same time, lifting the seat body 21 off of the seating surface 20, due to its rigid connection to the control piston through the piston rod 24 and the end piece 23 or connecting tube 22. The stroke is limited either by the bottoming of the compression spring 15 or by the provision of a stop, not shown here, for the control piston 16. In this position, the valve is open for the passage of the pressure medium.

FIG. 2 shows a second embodiment of the invention in which the same reference symbols are used as are used in the embodiment of FIG. 1, with a prime added for like parts. In FIG. 2 a valve housing 2', designed in the same manner as the seat valve of FIG. 1, includes a supporting structure 11', joined to the housing, and a control cylinder 12' which are connected together.

Walls are formed by a metal bellows 31, one end of which is connected to the control cylinder 12' and its other end is connected to the control piston 16'. In the normal position, i.e., when the control cylinder is not acted upon by a control fluid, the control piston practically matingly rests on the bottom surface, integrated in the supporting structure 11', of the pressure chamber 18' of the control cylinder 12'. The control piston 16' is supported by the compression spring 15' which encloses the piston rod 24' concentrically and whose other end rests against a stop 14' of the control cylinder.

In this seat valve design also, the connecting part between control piston and seat body is designed in the shape of a streamlined body or tubular connecting part 22' and 23' so that approximately the same flow section prevails over the entire structural length of the seat valve in an open condition. Despite the use of a metal bellows as the sealing element, the structural length of the seat valve can be shortened as compared to the known seat valves.

While specific embodiments of the invention have been shown and described in detail to illustrate the application of the principles of the invention, it will be understood that the invention may be embodied otherwise without departing from such principles.

What is claimed is:

1. A straight flow seat valve comprising a valve housing having a chamber extending therethrough between a fluid inlet at one end of said housing and a fluid outlet arranged coaxial with said inlet at the other end of said housing, a control cylinder fixedly supported in said chamber between said outlet and said inlet, a control piston movably disposed in said cylinder, a seating surface defined in said housing adjacent said outlet, a seat body movably mounted in said chamber adapted to matingly seat against said seating surface to close said outlet and being movable away from said seating surface to open said outlet, said seat body having a connecting part extending from one side of said cylinder adjacent said outlet to the opposite side of said cylinder adjacent said inlet, said connecting part being spaced inwardly of said housing, a piston rod carried by said piston rigidly connected to said seat body, spring means engaged with said piston for biasing said seat body against said seating surface, means extending out of said housing for admitting fluid into said cylinder to move said control piston against said spring to move said seat body off of said seating surface, and means supporting said cylinder in said chamber intermediate the length of said housing having an opening therethrough, said seat body including an intermediate tubular portion having a wall extending through said opening.

2. A straight flow seat valve, as claimed in claim 1, wherein said piston rod extends from said piston toward said inlet, said seat body having said connecting part being connected to said piston rod on the end thereof adjacent said inlet.

3. A straight flow seat valve, as claimed in claim 1, wherein said connecting part includes a conical end portion to form a constant flow cross-section in said valve chamber.

4. A straight flow valve according to claim 1, wherein said means supporting said cylinder includes a wall extending across said chamber supporting said control cylinder, said wall having openings extending therethrough, said seat body comprising a cylinder having a first and a second inwardly bevelled end facing said inlet and said outlet respectively.

5. A straight flow seat valve, as claimed in claim 4, wherein said second bevelled end has at least one aperture extending therethrough to establish flow communication between the respective sides thereof.

6. A straight flow seat valve, as claimed in claim 1, wherein said cylinder is disposed within said connecting part.

* * * * *